(12) United States Patent
Renedo

(10) Patent No.: US 11,327,721 B1
(45) Date of Patent: May 10, 2022

(54) SYSTEM FOR EXTENDING FUNCTIONALITY OF A COMPUTER PROGRAMMING LANGUAGE, AND RELATED METHOD AND SOFTWARE

(71) Applicant: Marco Renedo, Evergreen, CO (US)

(72) Inventor: Marco Renedo, Evergreen, CO (US)

( * ) Notice: Subject to any disclaimer, the term of this patent is extended or adjusted under 35 U.S.C. 154(b) by 0 days.

(21) Appl. No.: 17/170,076

(22) Filed: Feb. 8, 2021

(51) Int. Cl.
*G06F 8/30* (2018.01)
*G06F 8/41* (2018.01)

(52) U.S. Cl.
CPC .............. *G06F 8/31* (2013.01); *G06F 8/315* (2013.01); *G06F 8/433* (2013.01)

(58) Field of Classification Search
None
See application file for complete search history.

(56) References Cited

U.S. PATENT DOCUMENTS

| | | | | |
|---|---|---|---|---|
| 5,671,417 | A * | 9/1997 | Miclette | G06F 9/44521 717/130 |
| 5,754,858 | A * | 5/1998 | Broman | G06F 8/30 717/111 |
| 8,122,434 | B2 * | 2/2012 | Kostadinov | G05B 19/0426 717/121 |
| 2003/0070158 | A1 * | 4/2003 | Lucas | G06F 9/45508 717/114 |
| 2009/0144718 | A1 * | 6/2009 | Boggs | G06F 8/65 717/170 |
| 2011/0276950 | A1 * | 11/2011 | Fisher | G06F 8/437 717/140 |
| 2012/0005662 | A1 * | 1/2012 | Ringseth | G06F 8/453 717/149 |
| 2012/0054718 | A1 * | 3/2012 | Auerbach | G06F 8/436 717/116 |

OTHER PUBLICATIONS

Hedin et al., "Extending Languages by Leveraging Compilers: From Modelica to Optimica," IEEE, 2011, 7pg. (Year: 2011).*

* cited by examiner

*Primary Examiner* — Ryan D. Coyer
(74) *Attorney, Agent, or Firm* — Whitmyer IP Group, LLC

(57) ABSTRACT

A system for extending functionality of a computer programming language includes a programming interface, a module creator, an object creator, and a node compiler, all executing on a computer. The programming interface provides a code editor. The module creator defines a module based on user input received via the code editor. The module exports a function with a plurality of sub-functions, including a first sub-function and a second sub-function. The object creator defines a plurality of versions of an object based on user input received via the code editor, including a first version having a call for the function to take as an argument a first node including a first parameter linked to the first sub-function and a second node including a second parameter linked to the second sub-function. The node compiler detects a dependency between the first node and the second node.

19 Claims, 17 Drawing Sheets

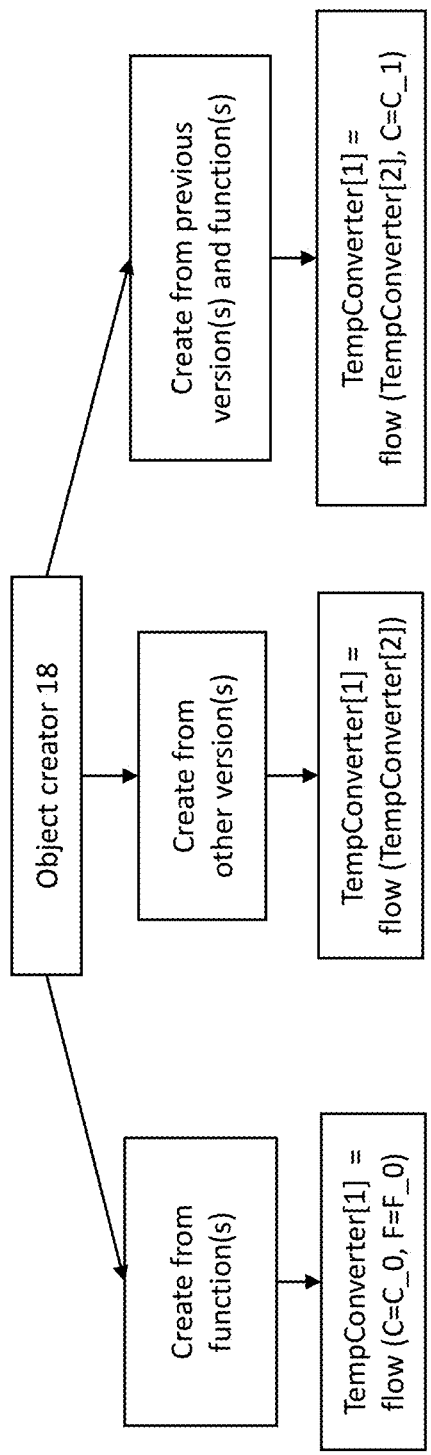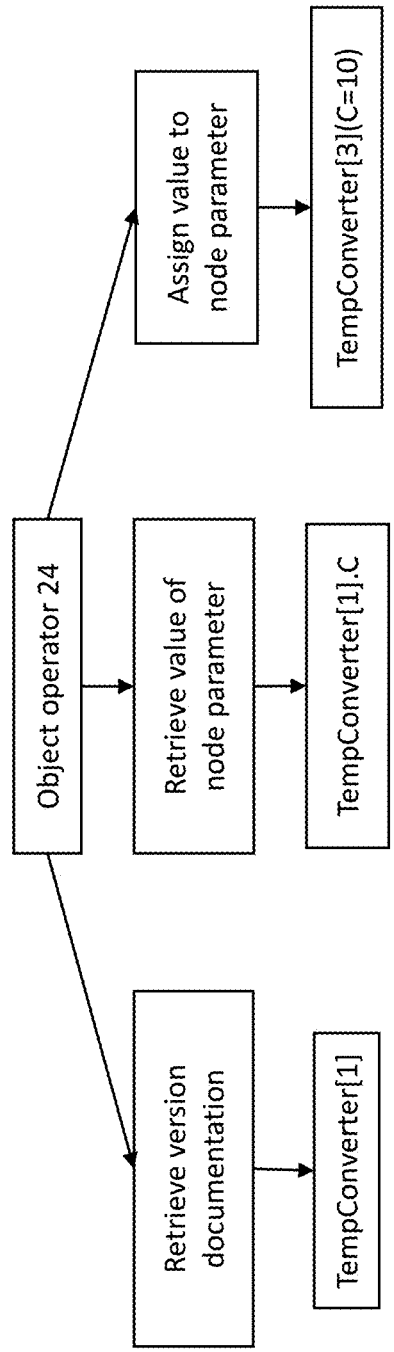
FIG. 5
FIG. 6

Programming Interface 14

Code editor 22

```
import flow                                    ⎯30
                                               ⎤
52-1 54-1                                      |
def C_0():                                     |
    """float                      ⎤—56-1       ⎬—32-1
    Celsius temperature"""        ⎦            |
    return 20  ⎤—58-1                          ⎦

52-2 54-2                                      ⎤
def F_0(C):                                    |
    """float                              ⎤—56-2   ⎬—32-2
    computes Fahrenheit from Celsius"""   ⎦         |
    return C*5/9+32  ⎤—58-2                    ⎦
              ⎣72-1
```

FIG. 7

Programming Interface 14

Code editor 22

TempConverter = {} — 36
37

TempConverter[0] = flow(name="TempConverter", doc="Converts Celsius to Fahrenheit") — 34-0
37  60-0  31                          76                        64-0

TempConverter[1] = flow(TempConverter[0], C=C_0, F=F_0) — 34-1
37  60-1  31    68-1  37  60-1  70-1 70-2
                              64-1  72-1  74-1  72-2  74-2

FIG. 8

Programming Interface 14

Code editor 22

52-3  54-3 def C_1():
    """float
    Celsius temperature
    default value is 30"""
    return 30

56-3 → 32-3
58-3

TempConverter[2] = flow(TempConverter[1], C=C_1)

SYSTEM FOR EXTENDING FUNCTIONALITY OF A COMPUTER PROGRAMMING LANGUAGE, AND RELATED METHOD AND SOFTWARE

TECHNICAL FIELD

The present disclosure generally relates to a system for computer programming, and a related method and software. The present disclosure more particularly relates to a system for extending functionality of a computer programming language using a node compiler, and a related method and software.

BACKGROUND

Functional and objected oriented programming languages are known in the art.

Functional programming languages use functions as a primary way to aggregate code, and they usually do not allow for the change of state of a variable. Because of these restrictions, it is hard to create new software. The inability to effect a change of state of a variable is counterintuitive. On the other hand, software developed in functional programming languages is relatively easier to maintain than software developed in object oriented programming languages, as there are less bugs and the software is more adaptable. Functional programming languages have become somewhat more popular now, but still the majority of software is written in object oriented programming languages.

Object oriented programming languages use functions, but they also have classes as a way of aggregating code. Classes are very flexible but they add many decisions on how to design them properly. It can be difficult for professional programmers to maintain software as it grows in complexity. A main obstacle is that object oriented software has to be designed properly or it will have to be redesigned from scratch many times during the life cycle of a software solution. The expertise needed to design proper software code using existing object oriented programming languages requires many years of experience as a professional programmer.

Aspects of the present invention are directed to these and other problems.

SUMMARY

According to an aspect of the present invention, a system for extending functionality of a computer programming language is provided. The system includes a computer, a programming interface, a module creator, an object creator, and a node compiler. The programming interface executes on the computer for providing a code editor. The module creator executes on the computer for defining a module based on user input received via the code editor. The module exports a function with a plurality of sub-functions, including a first sub-function and a second sub-function. The object creator executes on the computer for defining a plurality of versions of an object based on user input received via the code editor. The plurality of versions of an object include a first version having a call for the function to take as an argument a first node including a first parameter linked to the first sub-function and a second node including a second parameter linked to the second sub-function. The node compiler executes on the computer for detecting a dependency between the first node and the second node.

According to another aspect of the present invention, a method for extending functionality of a computer programming language is provided. The method includes the steps of: defining a module that exports a function with at least a first sub-function and a second sub-function; defining a version of an object including a call for the function to take as an argument at least a first node linked to the first sub-function and a second node linked to the second sub-function; and detecting a dependency between the first node and the second node.

According to another aspect of the present invention, a non-transitory computer-readable storage medium is provided on which a software is stored. The software for use with a computer programming platform having a module creator for defining a module that exports a function, and an object creator for defining a version of an object that includes a call for the function to take as an argument at least first and second nodes, linked to respective first and second sub-functions, of the function, the software executing to perform steps comprising detecting a dependency between the first node and the second node.

In addition to, or as an alternative to, one or more of the features described above, further aspects of the present invention can include one or more of the following features, individually or in combination:

- the dependency arises because the second sub-function takes the first parameter of the first node as an argument;
- the programming interface further provides an object operator for receiving instructions to execute at least one of the plurality of versions of the object, and the object operator is operable to retrieve a corresponding output from the object;
- the node compiler is operable to embed a respective data compilation in each of the plurality of versions of the object;
- each data compilation includes all node dependencies associated with the respective version of the object;
- the node dependencies are organized in a directed acyclic graph;
- each data compilation includes all documentations of all sub-functions linked to the respective version of the object;
- each data compilation includes all values of node parameters associated with the version;
- each data compilation includes all evaluation statuses for node parameters associated with the version; and before determining a value of a selected parameter, the object operator is operable to check the data compilation associated with the version of the object being executed to confirm that the selected parameter has an evaluation status of unevaluated;
- the plurality of versions of the object include a second version having a call for the function to take the first version of the object as an argument, and the node compiler is operable to copy all node dependencies from a first data compilation associated with the first version of the object to a second data compilation associated with the second version of the object;
- the second version of the object is defined such that the argument that the function is called to take includes a third node having the first parameter linked to a third sub-function that is different than the first sub-function, and the node compiler is operable to detect a new dependency resulting from the first parameter being linked to the third sub-function, and is operable to override any dependency copied to the second data compilation that conflicts with the new dependency;

the object creator is further operable to define the first version of the object such that the argument that the function is called to take includes a previous version of the object;

the object operator is operable to receive instructions including a name of the object and a name of a selected version among the plurality of versions of the object, and the object operator is operable to retrieve an output including all documentation and dependencies stored in the data compilation associated with the selected version of the object;

the object operator is operable to receive instructions including a name of the object, a name of a selected version among the plurality of versions of the object, and a parameter of a selected node of the selected version, and the object operator is operable to retrieve an output including a value of the parameter of the selected node;

a dictionary is provided for saving the module and the object;

the function is the only function exported by the module; and the object is not a class.

These and other aspects of the present invention will become apparent in light of the drawings and detailed description provided below.

BRIEF DESCRIPTION OF THE DRAWINGS

FIG. 5 schematically illustrates functions of the object creator of the system of FIG. 1.

FIG. 6 schematically illustrates functions of the object operator of the system of FIG. 1.

FIGS. 7-19 schematically illustrates the code editor (FIGS. 7, 8, 11, 13, 14, and 18) and object operator (FIGS. 9, 10, 12, 15-17, and 19) during use of the system of FIG. 1.

DETAILED DESCRIPTION

Figure 1:
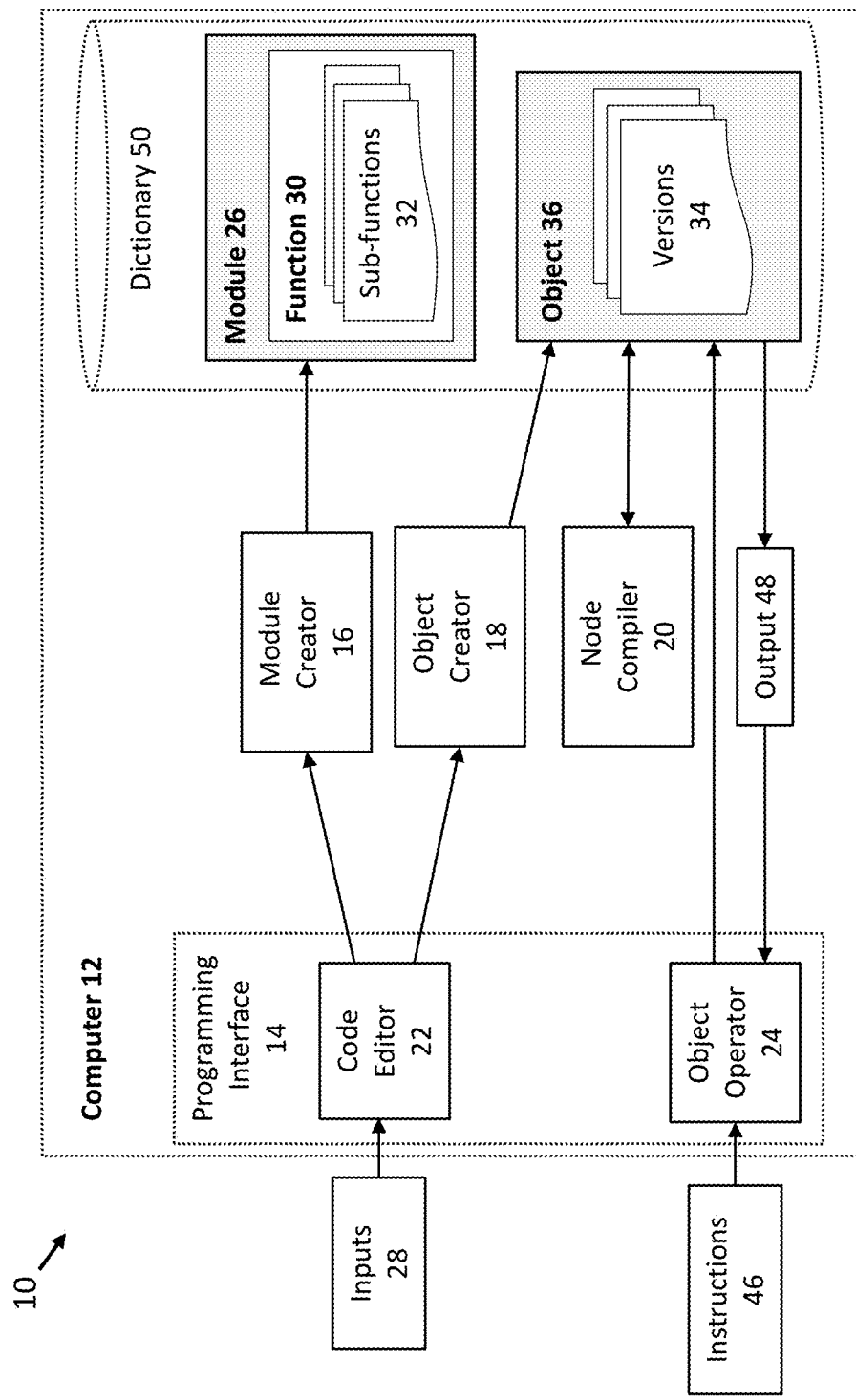
FIG. 1 schematically illustrates the present for extending functionality of a computer programming language.

Referring to FIG. 1, the present disclosure describes a system 10 for extending functionality of a computer programming language, as well as a related method and software.

Figure 2:
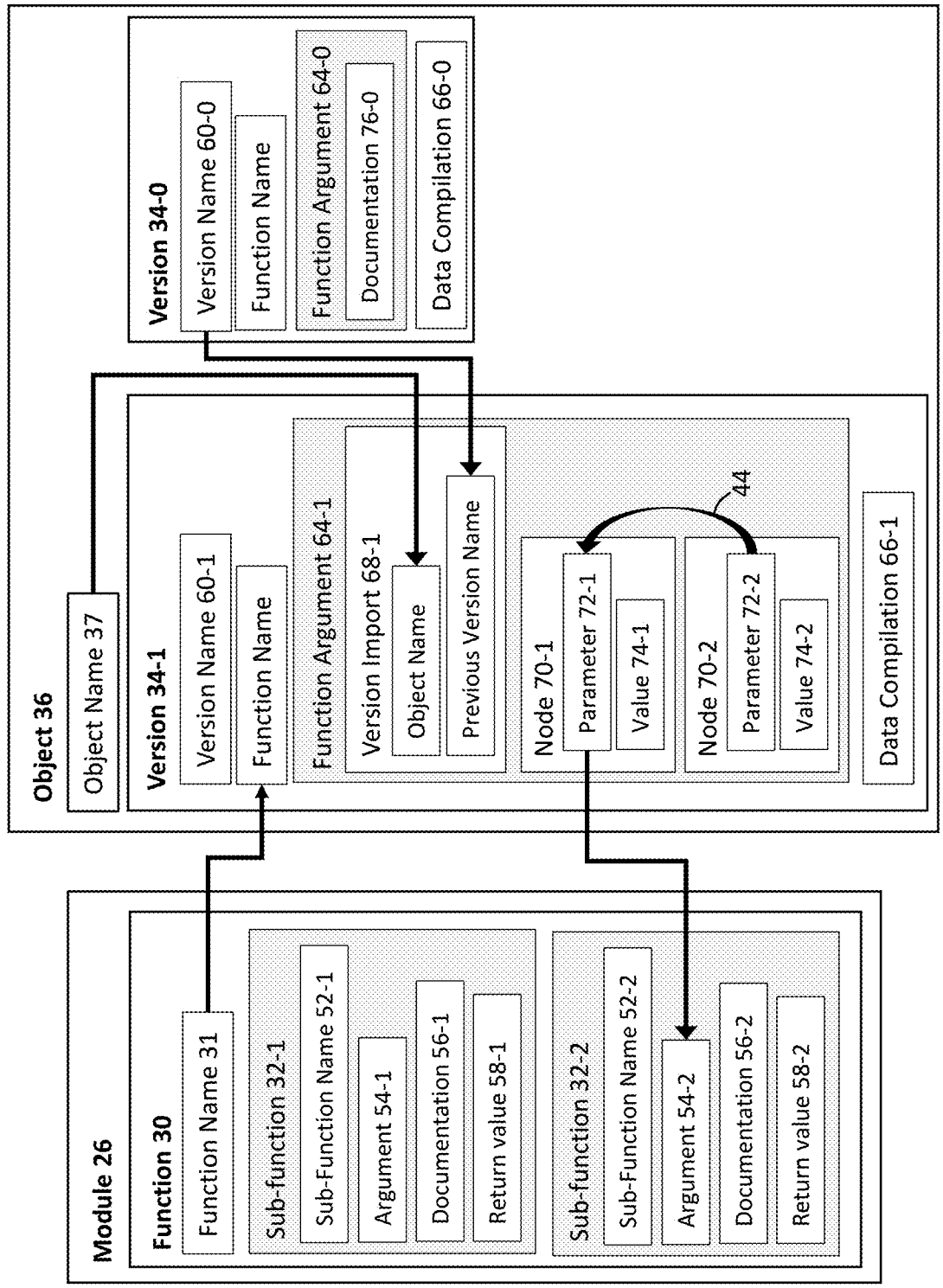
FIG. 2 schematically illustrates the module and the object of the system of FIG. 1.

Referring to FIGS. 1 and 2, the system 10 includes a computer 12 and several components executable thereon, including a programming interface 14, a module creator 16, an object creator 18, and a node compiler 20. The programming interface 14 provides a code editor 22 and an object operator 24. The module creator 16 is operable to define a module 26 based on user inputs 28 received via the code editor 22. Referring to FIG. 2, the module 26 is operable to export a function 30 with a function name 31 and a plurality of sub-functions 32, including at least a first sub-function 32-1 and a second sub-function 32-2. The object creator 18 is operable to define a plurality of versions 34 of an object 36 based on user inputs 28 received via the code editor 22, including at least a first version 34-1 having a call for the function 30 to take as an argument 64-1 a first node 70-1 with a first node parameter 72-1 linked to the first sub-function 32-1 and a second node 70-2 with a second node parameter 72-2 linked to the second sub-function 32-2. The node compiler 20 is operable to detect a dependency 44 between the first node 70-1 and the second node 70-2, which may arise, for example, because the second sub-function 32-2 takes the first node parameter 72-1 of the first node 70-1 as an argument 54-2. Referring to FIG. 1, the object operator 24 is operable to receive instructions 46 to execute at least one of the plurality of versions 34 of the object 36, and retrieves a corresponding output 48 from the object 36. In some embodiments, the system 10 further includes a dictionary 50 for saving the module 26 and the object 36.

Referring to FIG. 1, the programming interface 14, including the code editor 22 and the object operator 24, is operable for use with at least one programming language. In the illustrated embodiments, the programming language is an object oriented programming language (e.g., Python) and the programming interface 14 is implemented as a runnable environment for an objected oriented programming language (e.g., Jupyter notebooks).

Referring to FIG. 2, during operation of the system 10, the node compiler 20 preprocesses code entered as user inputs 28 into the code editor 22. The user inputs 28 makes use of a keyword that is assigned to be the name 31 of the function 30. One or more versions 34 of the object 36 are defined such that they recognize the function name 31. This has the effect of extending functionality of the programming language of the user inputs 28. The node compiler 20 preprocesses the code entered as user inputs 28 when the node compiler 20 encounters the name 31 of the function 30. The versions 34 of the object 36 are created at runtime when the code entered as user inputs 28 is compiled and run. Referring to FIG. 2, it is advantageous that the dependency 44 is created by having the second sub-function 32-2 takes as its argument 54-2 the node parameter 72-1 of a first node 70-1 linked to a first sub-function 32-1. In prior art systems, the argument 54-2 of the second sub-function 32-2 would remain internal to the function 30; it would have no user-identifiable connection to a node 70 of the object 36.

The functionality of each component of the system 10 can be implemented using analog and/or digital hardware (e.g., counters, switches, logic devices, memory devices, programmable processors, non-transitory thereof. In some embodiments, the system 10, or one or more components thereof, can perform one or more of the functions described herein by executing software, which can be stored, for example, in a non-transitory computer-readable storage medium (e.g., a memory device). Although the components are described as being discrete relative to one another, in some embodiments one or more of those components can be combined into a single component.

The module creator 16 is operable to define a module 26 based on user input 28 received via the code editor 22. In the illustrated embodiment, the module 26 is operable to export only a single function. Referring to FIG. 2, each of the plurality of sub-functions 32 is defined by a sub-function name 52, an argument 54, a documentation 56, and a return value 58. In some embodiments, the plurality of sub-functions 32 include more than two sub-functions.

The object creator 18 is operable to define a plurality of versions 34 of an object 36 (which is not a class) based on user input 28 received via the code editor 22. Referring to FIG. 2, each of the plurality of versions 34 of the object 36 is defined by a version name 60, a call for the function 30 to take one or more inputs as an argument 64 thereto, and a data compilation 66 encoded by the node compiler 20. The inputs taken as an argument 64 to function 30 can include at least one of a version import 68, a node 70 having a parameter 72 and a corresponding value 74, and a documentation 76. In the embodiment of FIG. 2, the version import 68 includes the name 37 of the object 36 and the name 60 of a previous version 34 of the object 36. In other embodiments, the version import 68 includes a name of another object and a name of a version of that other object.

Referring to the left branch of FIG. 5, during use of the system 10, the object creator 18 is operable to create a version of an object using one or more sub-functions. Referring to the middle branch of FIG. 5, the object creator 18 is operable to create a version of an object from one or more other versions of an object (e.g., a same or different object). Referring to the right branch of FIG. 5, the object creator 18 is operable to create a version of an object from a combination of one or more sub-functions and one or more other versions of an object.

Referring to FIG. 2, the node compiler 20 is operable to automatically detect (e.g., detect without further user action or intervention) a dependency 44 between nodes 70, each of which includes a respective parameter 72 linked to (e.g., via a pointer) at least one of the plurality of sub-functions 32. The node compiler 20 is operable to embed, monitor, and update data saved in each version 34 of the object 36 in the form of a data compilation 66. In some embodiments in which the programming interface 14 uses a compiled programming language, the node compiler 20 is configured as a pre-processor.

Figure 3:
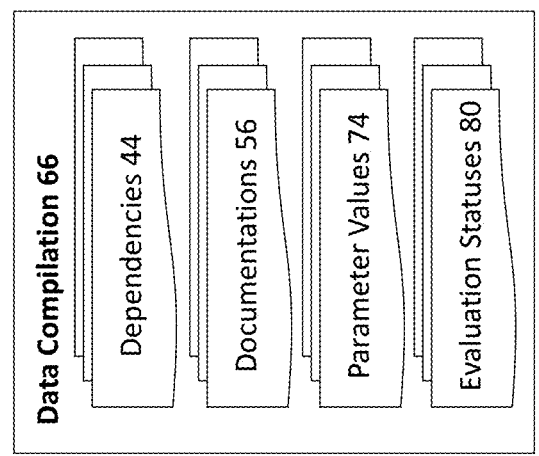
FIG. 3 schematically illustrates a data compilation of a version of the object included in the system of FIG. 1.

Referring to FIG. 3, each data compilation 66 embedded in the object versions 34 includes one or more node dependencies 44 associated with the version 34 of the object 36, one or more documentations 56 of sub-functions 32 linked (e.g., via a pointer) to the version 34 of the object 36, one or more values 74 of node parameters 72 associated with the version 34, and/or one or more evaluation statuses 80 for node parameters 72 associated with the version 34. In some embodiments, the node dependencies 44 are provided in the form of a network of the nodes 70 (i.e., a node network), a tree of the nodes 70 (i.e., a node tree), and/or a graph of the nodes 70 (i.e., a node graph), such as a node directed acyclic graph (DAG). In such embodiments, the node network, node tree, and/or node graph is created using at least the names 52 of the linked sub-functions 32.

Referring to FIG. 2, the node compiler 20 is operable to copy node dependencies 44 from a data compilation 66 of one version 34 of the object 36 and embed the node dependencies 44 in the data compilation of another version of the object 36. The node compiler 20 is operable to detect a new dependency 44 that arises when a sub-function 32 linked to one node 70 is assigned to take a parameter 72 of another node 70 as an argument 54 thereto. The node compiler 20 is operable to override any previous dependency 44 in the data compilation 66 that conflicts with the new dependency 44. In some embodiments in which the programming interface 14 uses a compiled programming language, the node compiler 20 is configured as a pre-processor.

Figure 4:
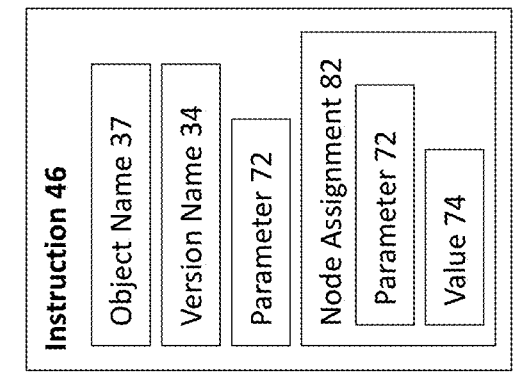
FIG. 4 schematically illustrates an instruction received by the system of FIG. 1.

The object operator 24 is operable to receive instructions 46 to execute a version 34 of the object 36, and retrieve a corresponding output 48 from the object 36. Referring to FIG. 4, the instructions 46 may include one or more of an object name 37, a version name 34, a node parameter 72, and/or a node assignment 82 having a node parameter 72 and a corresponding value 74. The output 48 includes data stored in the data compilation 66 associated with the selected version 34 of the object 36.

Referring to the left branch of FIG. 6, during use of the system 10, the object operator 24 is operable to receive instructions 46 including an object name 37 and a version name 60, and is operable to retrieve all documentation 56 from the data compilation 66 of the selected version 34. Referring to the middle branch of FIG. 6, the object operator 24 is operable to receive instructions 46 including an object name 37, a version name 60, and a node parameter 72, and is operable to retrieve a value 74 of the selected node parameter 72. Each version 34 of the object 36 includes a get operator for retrieving values 74 of node parameters 72. Before determining the value 74, the object operator 24 is operable to check the data compilation 66 of the selected version 34 to confirm that the parameter 72 has an evaluation status 80 of unevaluated. If a value 74 has not been evaluated, the get operator calls the appropriate sub-function 32 to obtain the value 74. Referring to the right branch of FIG. 6, the object operator 24 is operable to receive instructions 46 including an object name 37, a version name 60, and a node assignment 82 with a selected parameter 72 and value 74, and is operable to assign that value 74 to the selected parameter 72. Each version 34 of the object 36 includes a set operator for setting values 74 of node parameters 72. If a value of a first node has been set, then all other nodes having a dependency with the first node (i.e., all descendent nodes of the first node) have their node values deleted and such node values are recomputed if and when requested by the user.

FIGS. 7-19 schematically illustrates the code editor (FIGS. 7, 8, 11, 13, 14, and 18) and object operator (FIGS. 9, 10, 12, 15-17, and 19) during use of the system of FIG. 1.

FIG. 7 shows use of the code editor 22 to receive user inputs 28 with which the module creator 16 imports the function 30 having the name 31 of "flow," and defines the first sub-function 32-1 having the name 52-1 of "C_0" and the second sub-function 32-2 having the name 52-2 of "F_0" (see FIG. 2).

FIG. 8 shows use of the code editor 22 to receive user inputs 28 with which the object creator 18 defines the object 36 having the name 37 of "TempCoverter" to include a version 34-0 that takes documentation 76 as an argument 64-0, and another version 34-1 that takes several inputs as an argument 64-1, including an import 68-1 of the prior version 34-0, as well as the first and second nodes 70-1, 70-2 having parameters 72-1, 72-2 (C and F) defined to have values 74-1, 74-2 (C_0 and F_0) linked to the first and second sub-functions 32-1, 32-2.

Figure 9:
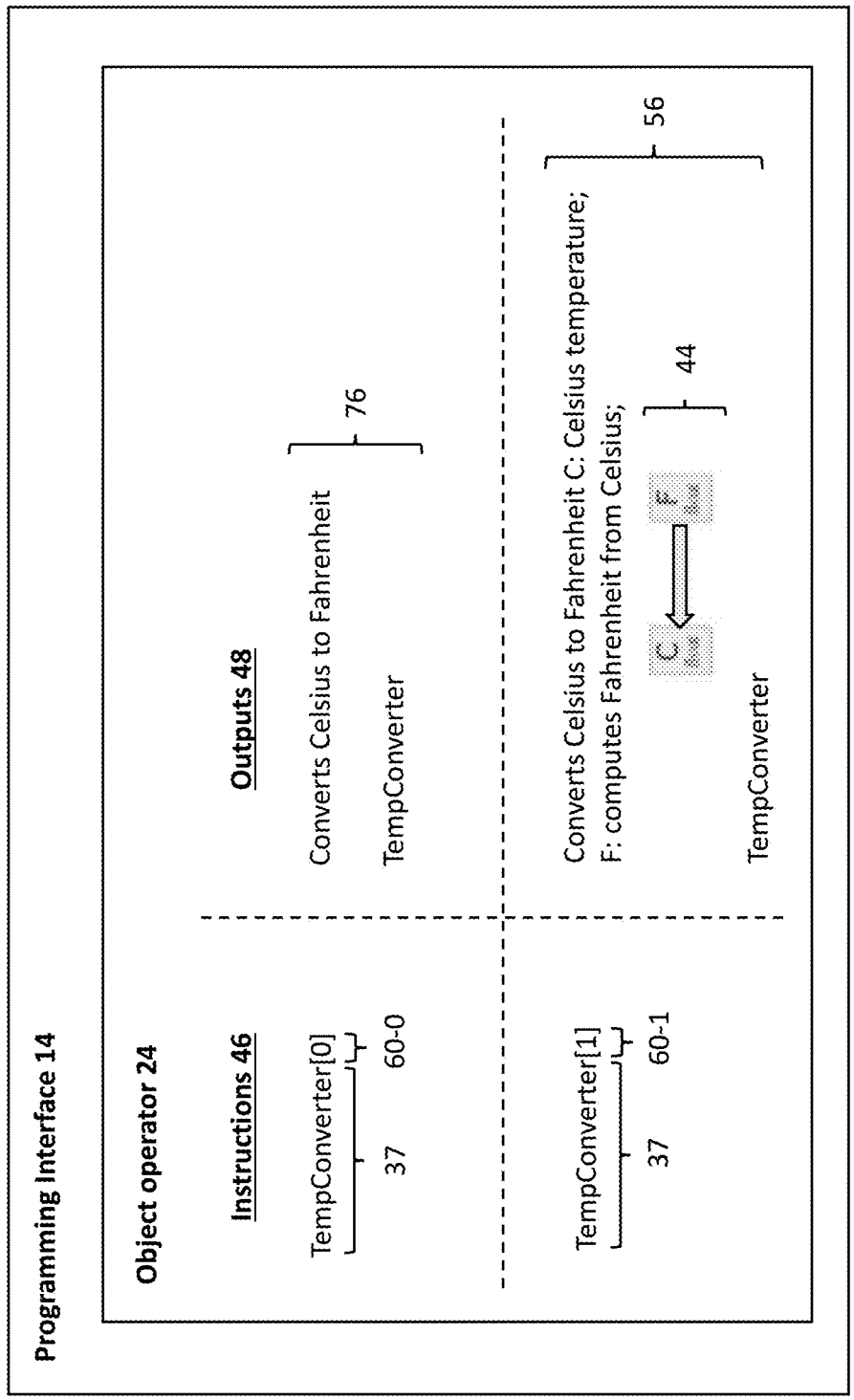

FIG. 9 shows use of the object operator 24 to receive instructions 46 including the object name 37 ("TempCoverter") and the names 60-0, 60-1 of the object versions 34-0, 34-1 (versions "0" and "1"), with which the object operator 24 retrieves outputs 48 including the appropriate documentation 76, 56. The bottom of FIG. 9 shows that the node compiler 20 has aggregated the documentations 56 of all the sub-functions 32-1, 32-2 linked to nodes 70-1, 70-2 of the version 34-1. The version 34-0 is shown to include no nodes, and thus it only displays documentation 76. As discussed above, the parameters 72-1, 72-2 (C and F) of the first and second nodes 70-1, 70-2 are linked to the corresponding sub-functions 32-1, 32-2 (C_0 and F_0). The node compiler 20 is operable to detect that the sub-function 32-2 (F_0), which is linked to the second node parameter 72-2 (F), takes the first node parameter 72-1 (C) of the first node 70-1 as an argument 54-2 (see FIG. 7). The node compiler 20 then determines that there is a dependency 44 between the first and second nodes 70-1, 70-2.

Figure 10:
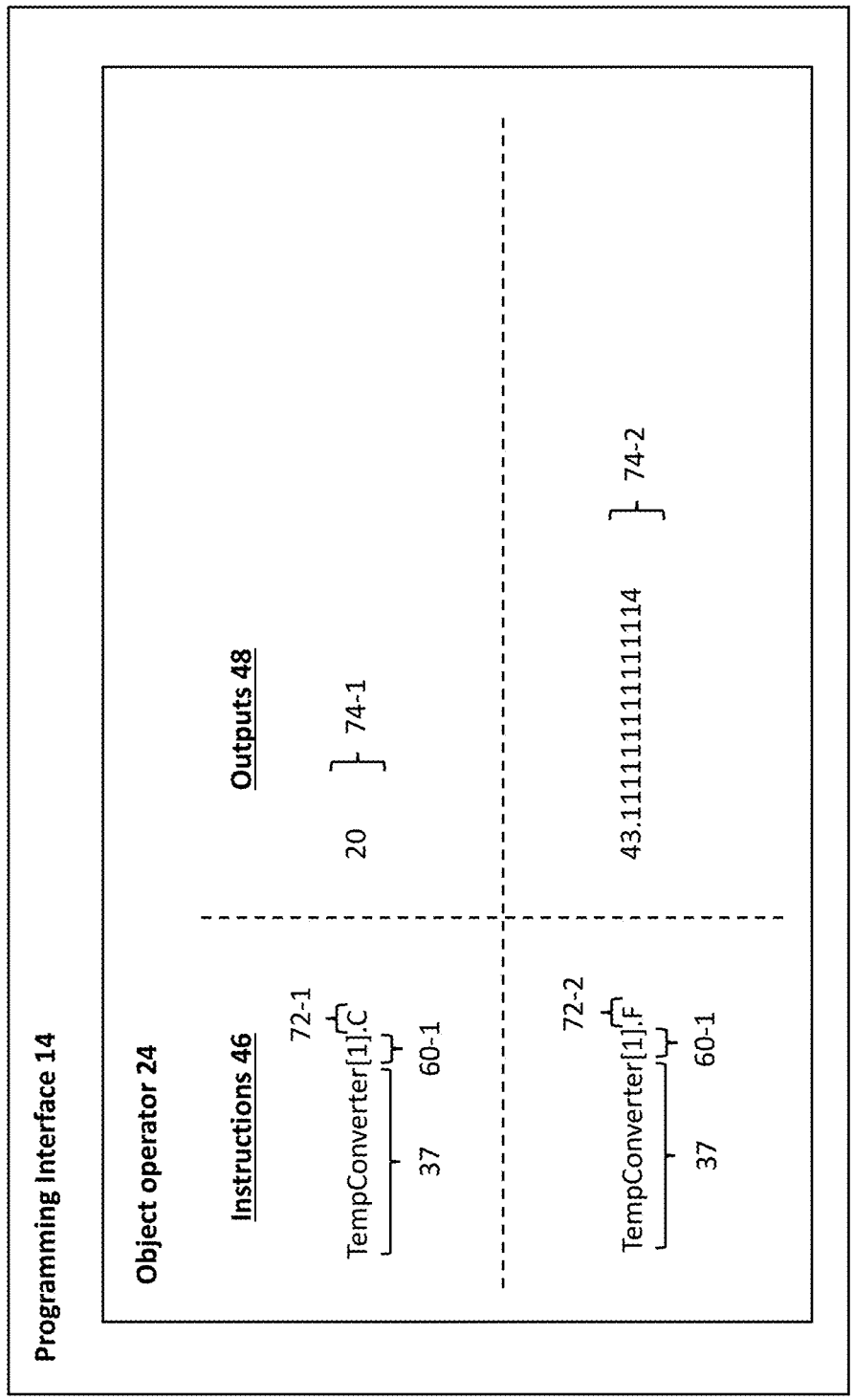

FIG. 10 shows use of the object operator 24 to receive instructions 46 including the object name 37 ("Temp-Coverter"), version name 60-1 (version "1"), and node parameters 72-1, 72-2 (C and F), with which the object operator 24 retrieves values 74 of the selected node parameters 72. When the first node parameter 72-1 (C) is selected (see top portion of FIG. 10), the object operator 24 checks the evaluation statuses 80 in the data compilation 44 of the selected version 34-1 to determine if the first node parameter 72-1 has already been evaluated. If yes, the object operator 24 retrieves an output 48 including the value 74-1 of the selected parameter 72-1. This process is repeated when the second node parameter 72-2 (F) is selected (see bottom portion of FIG. 10).

FIG. 11 shows use of the code editor 22 to receive user inputs 28 with which the module creator 16 defines the third sub-function 32-3 having the name 52-3 of "C_1," and with which the object creator 18 defines a new version 34-2 of the object 36 that takes as an argument 64-2 an import 68-2 of the prior version 34-1, as well as third node 70-3 having the first node parameter 72-1 (C) linked to a third sub-function 32-3 (C_1) that is different than the first sub-function 32-1. This allows the user to extend the functionality of the object 36 to have a different behavior of the first node parameter 72-1 (C) than that given by the first fub-function 32-1 (C_0). The linking of the third sub-function 32-3 (C_1) to the first node parameter 72-1 (C) causes the node compiler 20 to update the behavior of the first node 70-1, recalculate node dependencies 44, and save such changes to the data compilation 66-2 of the object version 34-2.

Figure 12:
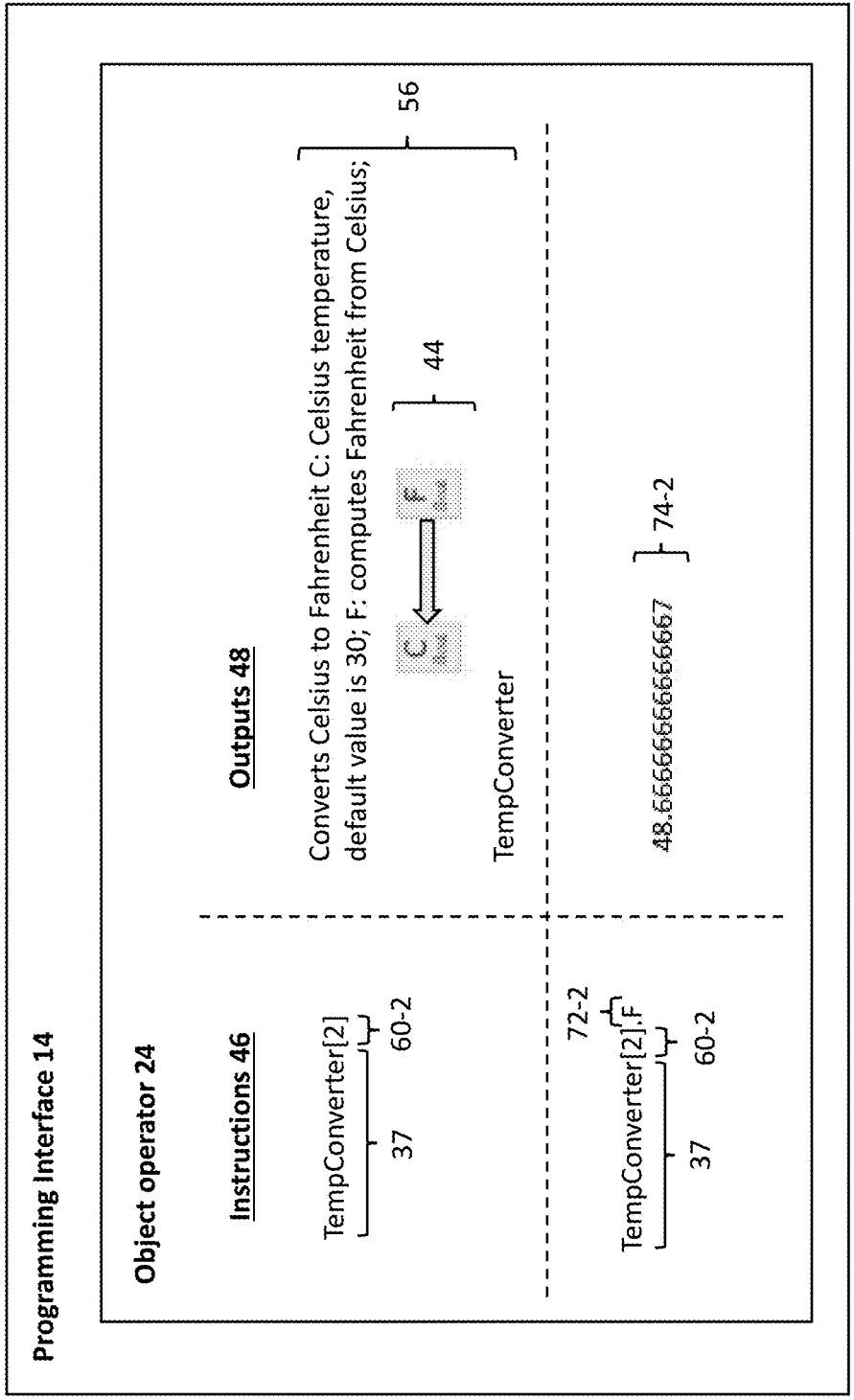

FIG. 12 (see top) shows use of the object operator 24 to receive instructions 46 including the object name 37 ("TempCoverter") and the version name 60-2 (version "2"), with which the object operator 24 retrieves outputs 48 including the appropriate documentations 56-2. FIG. 12 shows that the node compiler 20 has aggregated the documentations 56-1, 56-2 of all the sub-functions 32-1, 32-2 used for each node 70-1, 70-2 linked to the version 34-2. The documentation 56-2 provided in the output 48 now indicates that the "default value is 30," as set forth in the documentation 56-3 of the sub-function 32-3 (see FIG. 11). FIG. 12 (see bottom) also shows that the functionality described above in connection with FIG. 10 is repeated, and the value 74-2 of the second node parameter 72-2 (F) has changed.

Figure 13:
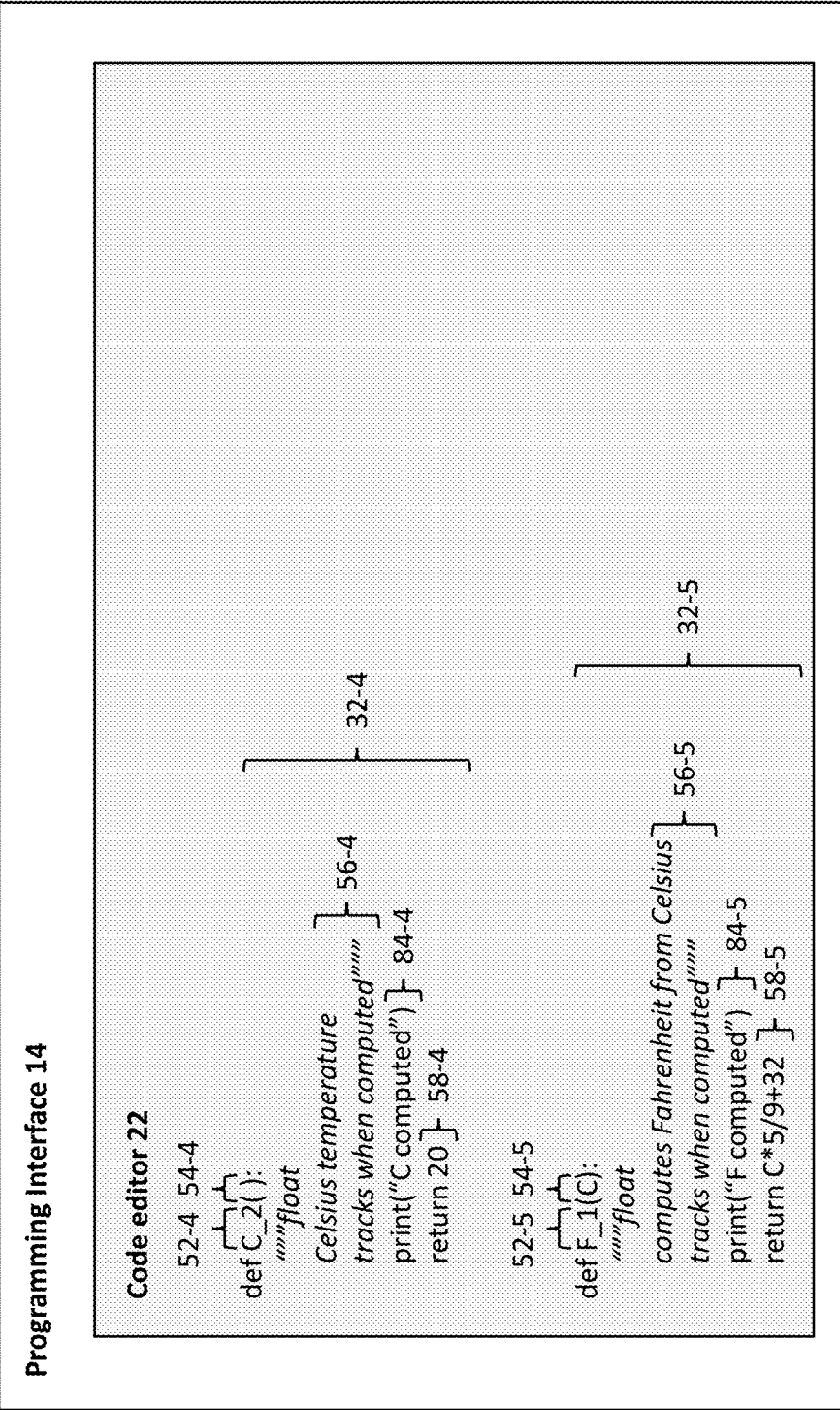
Figure 14:
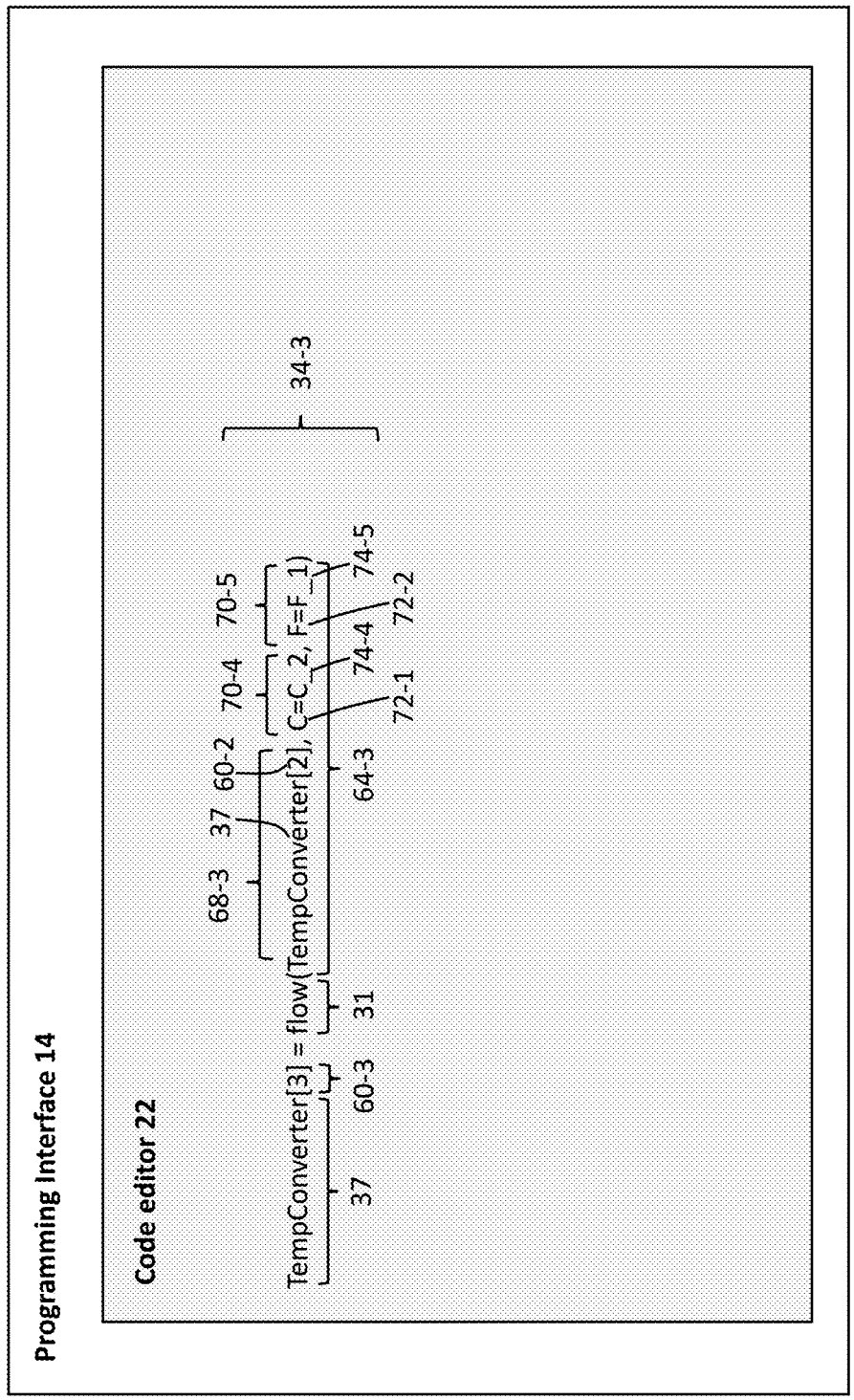
Figure 15:
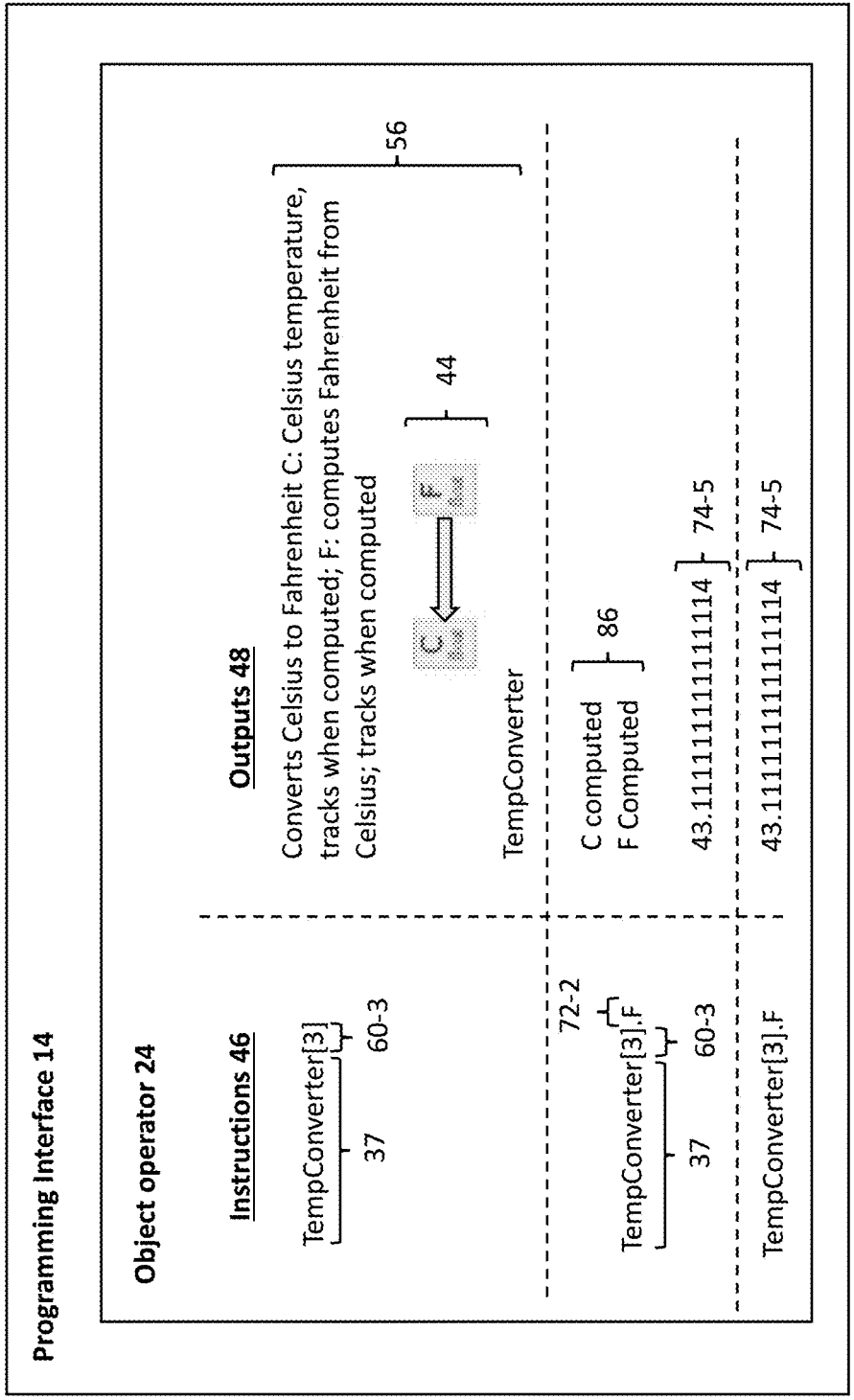

FIG. 13 shows the creation of new sub-functions 32-4, 32-5 (C_2 and F_1) and FIG. 14 shows the creation of a new object version 34-3 that links the first node parameter 72-1 (C) to the new sub-function 32-4 (C_2) and links the second node parameter 72-2 (F) to the new sub-function 32-5 (F_1). The new sub-functions 32-4, 32-5 (C_2 and F_1) and new object version 34-3 allow the user to extend the functionality of the object 36 to have still different behaviors for the first and second node parameters 72-1, 72-2 (C and F). The new sub-functions 32-4, 32-5 include print commands 84-4, 84-5. As shown in FIG. 15, the inclusion of these print commands 84-4, 84-5 causes corresponding computation notifications 86 to be included in the output 48 each time one of the values 74 of a node parameter 72 is computed or re-computed by the node compiler 20. In the middle of FIG. 15, the second node parameter 72-2 (F) is requested in connection with the new object version 32-3, and the notification 86 provided in the output 48 indicates that the first and second node parameters 72-1, 72-2 (C and F) had not yet been computed in connection with this object version 32-3.

At the bottom of FIG. 15, it is shown that when the second node parameter 72-2 (F) is again requested, there is no computation notification 86 provided in the output 48 since the parameter 72-2 (F) had already been computed and saved to the data compilation 66-3 of the object version 32-3 by the node compiler 20.

Figure 16:
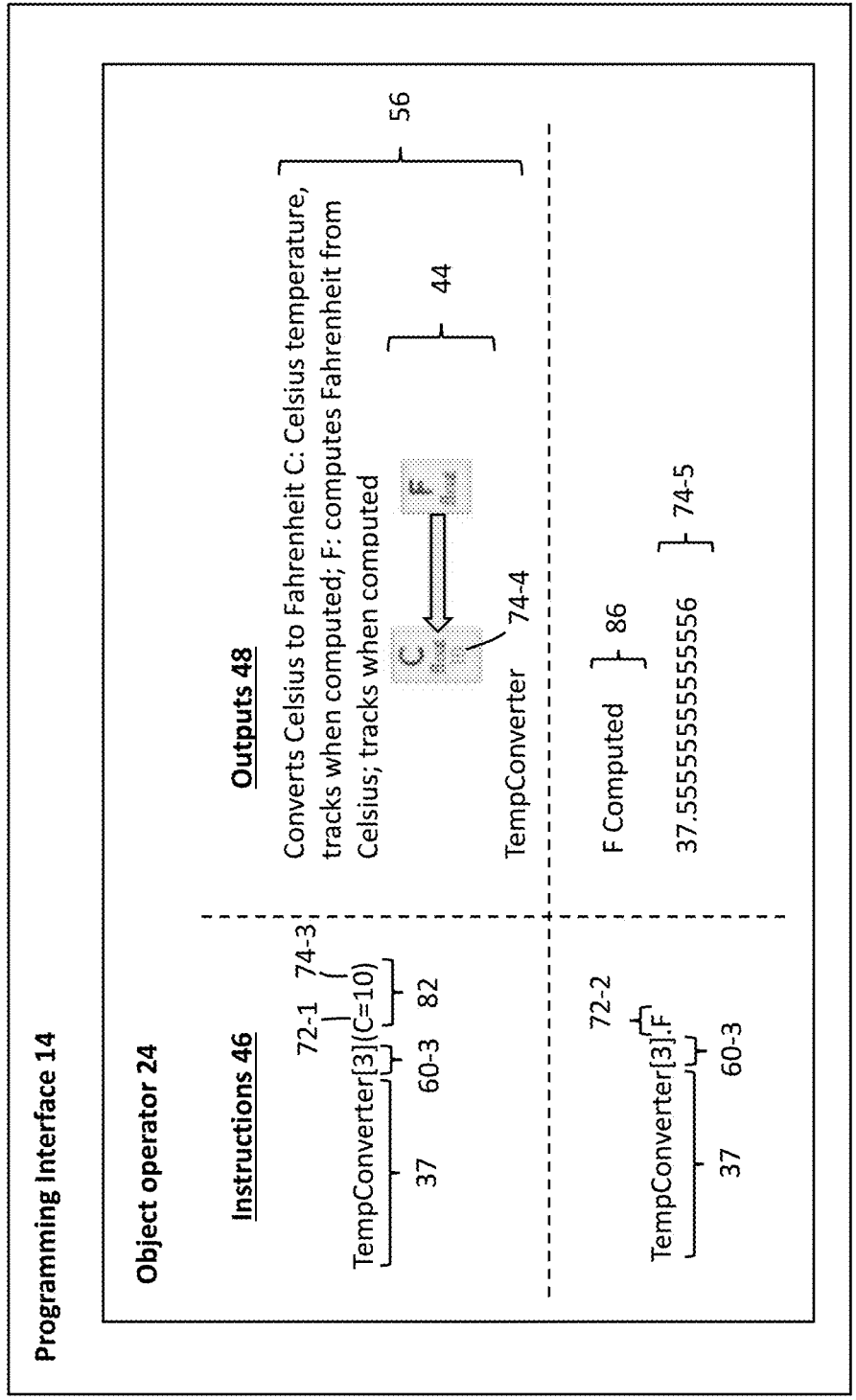
Figure 17:
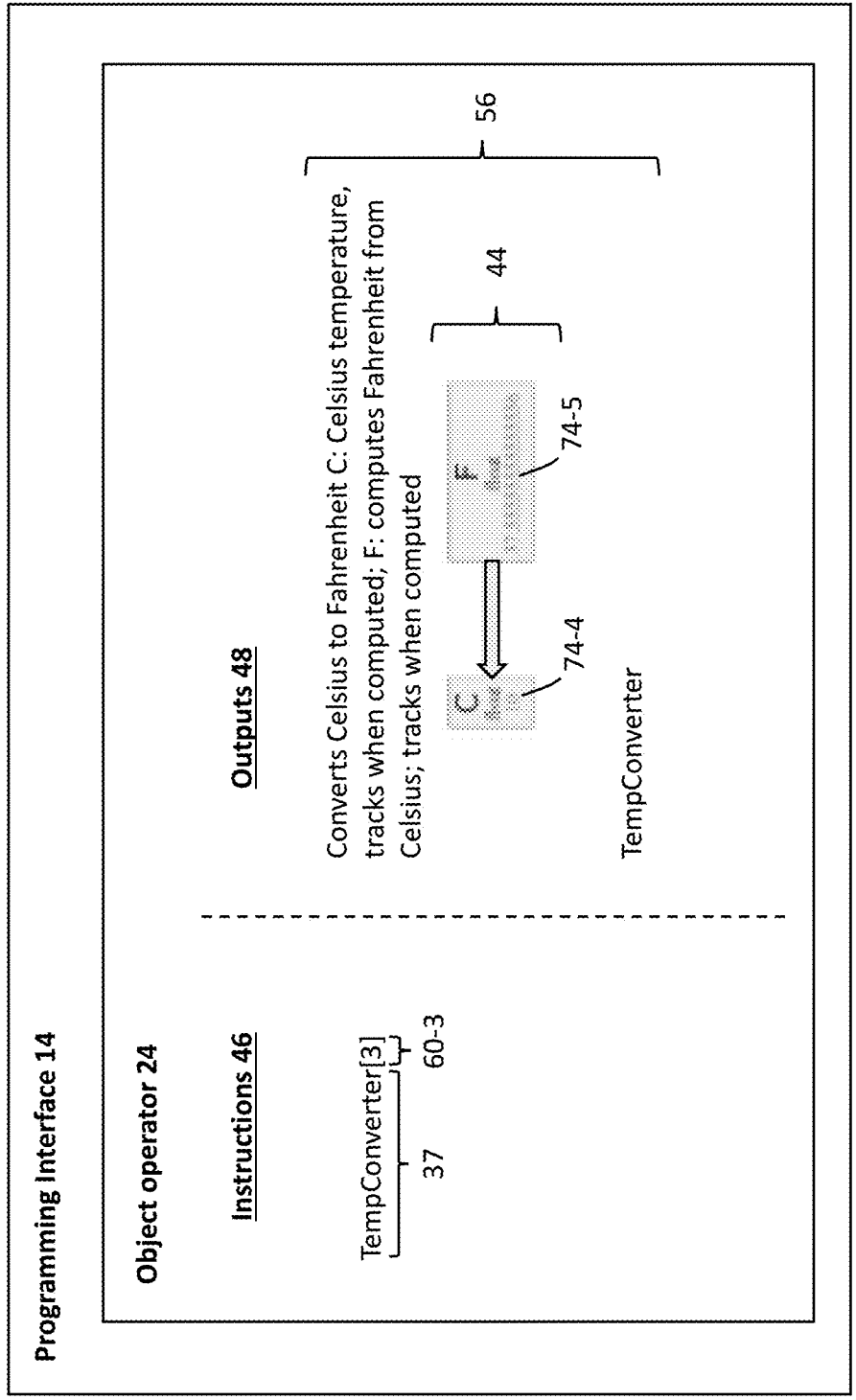

The top portion of FIG. 16 shows use of the object operator 24 to receive instructions 46 for changing the value 74-3 of the first node parameter 72-1 (C) in connection with this version 32-3 of the object 36. The instructions 46 include a node assignment 82 including the first node parameter 72-1 (C) and a new value 74-3 for the first node parameter 72-1 (C). The top portion of FIG. 16 further shows that the new value 74-3 for the first node parameter 72-1 (C) is depicted in the graphic for the dependency 44 between the first and second node parameters 72-1, 72-2 (C and F). The bottom portion of FIG. 16 further shows the output 48 when the second node parameter 72-2 (F) is again requested. The value 74-5 of the second node parameter 72-2 (F) is computed, as shown by the computation notification 86. FIG. 17 shows that when the documentation 56-3 of the object version 32-3 is requested, the newly-computed value 74-5 of the second node parameter 72-2 (F) is also depicted in the graphic for the dependency 44.

Figure 18:
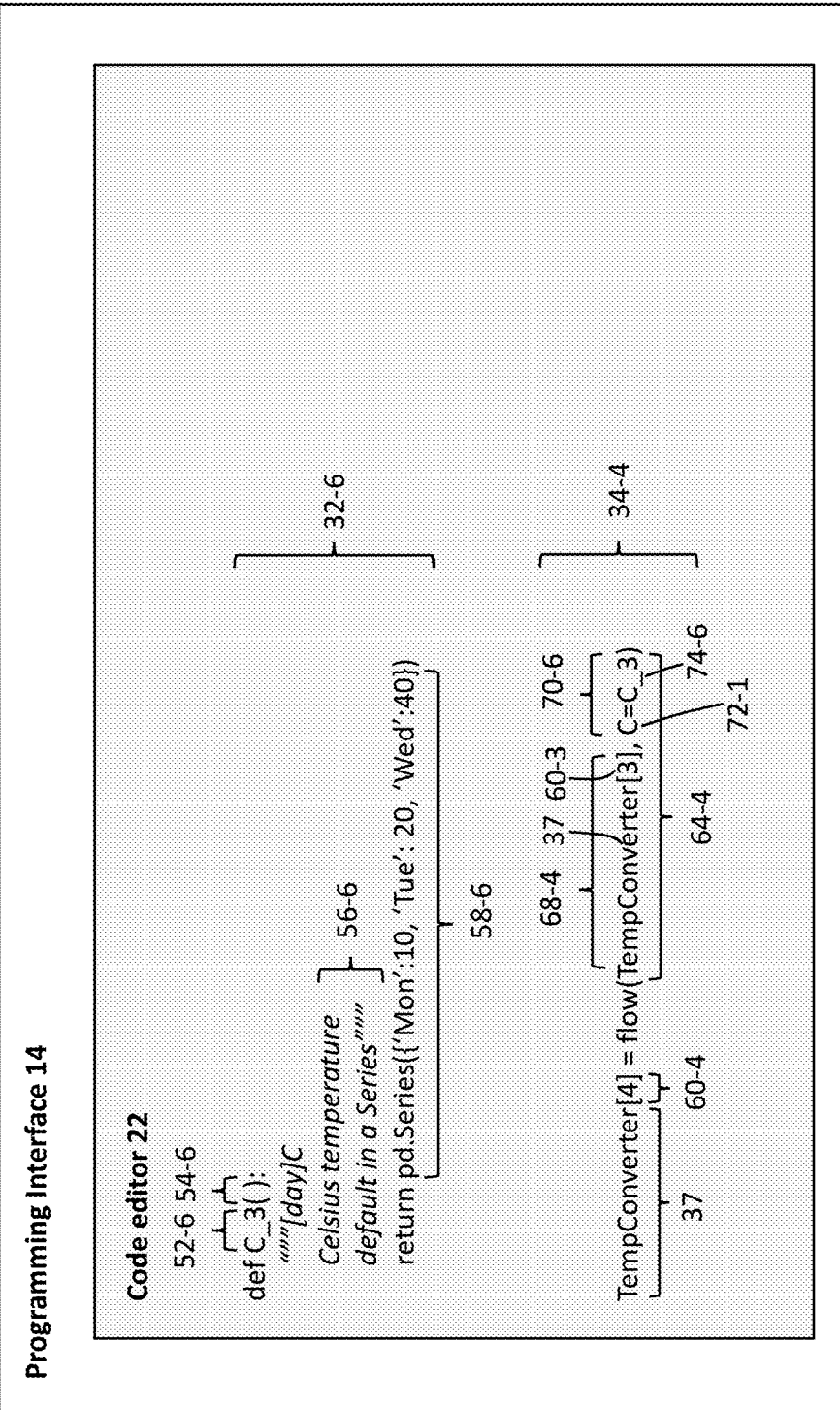
Figure 19:
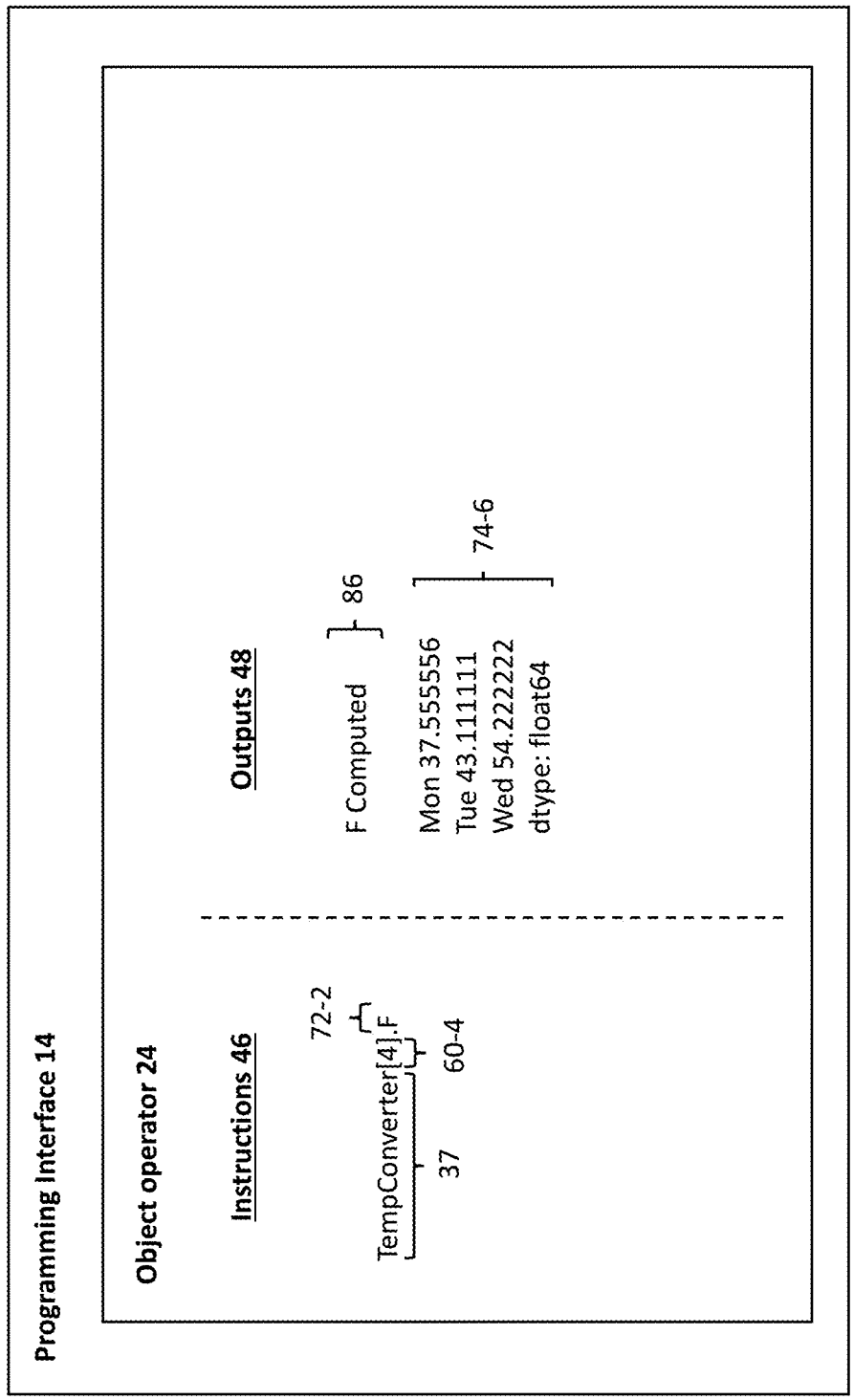

FIG. 18 shows the creation of a new sub-function 32-6 (C_3) and FIG. 19 shows the creation of a new object version 34-4 that links the first node parameter 72-1 (C) to the new sub-function 32-6 (C_3). The new sub-function 32-6 (C_3) is notable in that the return value 58-6 is a data series (named "pd.Series") having temperature data for the days Monday, Tuesday, and Wednesday. FIG. 19 shows that when the second node parameter 72-2 (F) is requested in connection with the new object version 32-4, a notification 86 is provided in the output 48 indicating re-computation of the value 74-5 of second node parameter 72-2 (F), which would have been copied from the data compilation 66-3 of the prior version 34-3 to the data compilation 66-4 of the present version 34-4 by the node compiler 20. FIG. 19 also shows that the value 74-5 of second node parameter 72-2 (F) is provided as a data series due to the dependency 44 between the second node parameter 72-2 (F) and the first node parameter 72-1 (C), which is linked to the new sub-function 32-6 (C_3) that returns a data series.

Referring again to FIGS. 1 and 2, another aspect of the invention involves a method that includes the steps of: defining a module 26 that exports a function 30 with at least a first sub-function 32-1 and a second sub-function 32-2; defining a version 34 of an object 36 including a call for the function 30 to take as an argument 64 with at least a first node 70-1 linked to the first sub-function 32-1 and a second node 70-2 linked to the second sub-function 32-2; and detecting a dependency 44 between the first node 70-1 and the second node 70-2.

Referring still to FIGS. 1 and 2, another aspect of the invention involves a non-transitory computer-readable storage medium on which a software for use with a computer programming platform is stored. The computer programming platform includes a module creator 16 for defining a module 26 that exports a function 30, and an object creator 18 for defining a version 34 of an object that includes a call for the function 30 to take as an argument 64 at least first and second nodes 70-1, 70-2, linked to respective first and second sub-functions 32-1, 32-2 of the function 30. The software is executable to perform steps comprising detecting a dependency 44 between the first node 70-1 and the second node 70-2.

The present disclosure describes aspects of the invention with reference to the exemplary embodiments illustrated in the drawings; however, aspects of the invention are not limited to the exemplary embodiments illustrated in the drawings. It will be apparent to those of ordinary skill in the art that aspects of the invention include many more embodiments. Accordingly, aspects of the invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A system for extending functionality of a computer programming language, comprising:
   a computer;
   a programming interface executing on the computer for providing a code editor;
   a module creator executing on the computer for defining a module based on user input received via the code editor, the module exporting a function with a plurality of sub-functions, including a first sub-function and a second sub-function;
   an object creator executing on the computer for defining a plurality of versions of an object based on user input received via the code editor, including a first version having a call for the function to take as an argument a first node including a first parameter linked to the first sub-function and a second node including a second parameter linked to the second sub-function; and
   a node compiler executing on the computer for detecting a dependency between the first node and the second node, wherein the dependency arises because the second sub-function takes the first parameter of the first node as an argument.

2. The system of claim 1, wherein the programming interface further provides an object operator for receiving instructions to execute at least one of the plurality of versions of the object; and wherein the object operator is operable to retrieve a corresponding output from the object.

3. The system of claim 2, wherein the node compiler is operable to embed a respective data compilation in each of the plurality of versions of the object;
   wherein each data compilation includes all node dependencies associated with the respective version of the object.

4. The system of claim 3, wherein the node dependencies are organized in a directed acyclic graph.

5. The system of claim 3, wherein each data compilation includes all documentations of all sub-functions linked to the respective version of the object.

6. The system of claim 3, wherein each data compilation includes all values of node parameters associated with the version.

7. The system of claim 5, wherein each data compilation includes all evaluation statuses for node parameters associated with the version and wherein, before determining a value of a selected parameter, the object operator is operable to check the data compilation associated with the version of the object being executed to confirm that the selected parameter has an evaluation status of unevaluated.

8. The system of claim 5, wherein the plurality of versions of the object include a second version having a call for the function to take the first version of the object as an argument; and
   wherein the node compiler is operable to copy all node dependencies from a first data compilation associated with the first version of the object to a second data compilation associated with the second version of the object.

9. The system of claim 7, wherein the second version of the object is defined such that the argument that the function is called to take includes a third node having the first parameter linked to a third sub-function that is different than the first sub-function; and
   wherein the node compiler is operable to detect a new dependency resulting from the first parameter being linked to the third sub-function, and is operable to override any dependency copied to the second data compilation that conflicts with the new dependency.

10. The system of claim 7, wherein the object creator is further operable to define the first version of the object such that the argument that the function is called to take includes a previous version of the object.

11. The system of claim 7, wherein the object operator is operable to receive instructions including a name of the object and a name of a selected version among the plurality of versions of the object; and
    wherein the object operator is operable to retrieve an output including all documentation and dependencies stored in the data compilation associated with the selected version of the object.

12. The system of claim 7, wherein the object operator is operable to receive instructions including a name of the object, a name of a selected version among the plurality of versions of the object, and a parameter of a selected node of the selected version; and
    wherein the object operator is operable to retrieve an output including a value of the parameter of the selected node.

13. The system of claim 1, further comprising a dictionary for saving the module and the object.

14. The system of claim 1, wherein the function is the only function exported by the module.

15. The system of claim 1, wherein the object is not a class.

16. A method for extending functionality of a computer programming language, comprising:
    executing a programming interface on a computer for providing a code editor;
    executing a module creator on the computer for defining a module based on user input received via the code editor, the module exporting a function with a plurality of sub-functions, including a first sub-function and a second sub-function;
    executing an object creator on the computer for defining a plurality of versions of an object based on user input received via the code editor, including a first version having a call for the function to take as an argument a first node including a first parameter linked to the first sub-function and a second node including a second parameter linked to the second sub-function; and
    executing a node compiler on the computer for detecting a dependency between the first node and the second node, wherein the dependency arises because the second sub-function takes the first parameter of the first node as an argument.

17. The method of claim 16, further comprising: receiving an instruction to execute the version of the object; and providing an output with the dependency in response to the instruction.

18. A non-transitory computer-readable storage medium on which a software is stored, the software for use with a computer programming platform to provide a method for extending functionality of a computer programming language according to claim 16.

19. The non-transitory computer-readable storage medium of claim 18, wherein the computer programming platform is a python platform.

\* \* \* \* \*